3,035,928
GLASS COMPOSITION

Charles E. Searight, Jackson, Miss., assignor to Cataphote Corporation, Toledo, Ohio, a corporation of Ohio
No Drawing. Filed Oct. 14, 1960, Ser. No. 62,532
4 Claims. (Cl. 106—54)

This invention relates to an improved glass composition and, more particularly, to an improved glass composition suitable for the manufacture of solid spherical glass beads.

In the manufacture of glass beads for use in reflective road signs, reflective road and curb markings, and the like, it is of paramount importance that the glass composition meet certain rigid requirements, both as to chemical and physical characteristics. Among the characteristics which the glass composition must exhibit includes relatively low viscosity and high surface tension of the molten glass batch to enable the molten material to become spherulized readily when properly treated. Other characteristics include hardness, structural stability, and resistance to erosion and deterioration by atmospheric conditions.

It is well known in the glass art that a soda-lime-silica glass will provide glass beads of desirable physical and chemical properties by the customary bead-making processes. However, a disadvantage of soda lime glass for the use in the manufacture of glass beads resides in the fact that it is extremely difficult to make the beads spherical, due principally to the relatively high viscosity and relatively low surface tension of such glasses. A further disadvantage of soda-lime glass is that a relatively large quantity of free alkali is present on the surface of the glass which causes severe deterioration under extreme conditions of exposure. Still a further disadvantage of soda-lime glass is its tendency to form bubbles by gas inclusions therein while the composition is being spherulized.

One method conventionally employed in the manufacture of macroscopic glass beads is to fragmentize manufactured glass and then introducing the powdered glass into a stream of heated gases to soften the glass sufficiently to enable surface tension to spherulize the particles. This method of producing small beads from manufactured glass is shown in the Charles E. Searight Patent 2,730,841, dated January 17, 1956, and entitled "Production of Silicone-Coated Glass Beads." The glass originally employed may be pieces of standard sheet glass, plate glass or container glass pulverized to the desired particle size. However such glasses currently used in the manufacture of glass beads, contain certain elements, such as ferric oxide, which are objectionable because they tend to produce gas inclusions. These gas inclusions are detrimental to the structural strength of macroscopic glass beads.

It is an object of the present invention to produce a glass composition which is especially adapted for the manufacture of glass beads of a refractive index of from about 1.50 to about 1.60.

Another object of the invention is to produce a glass composition which is capable of withstanding severe exposure conditions.

Still another object of the invention is to produce a glass composition having characteristics enabling it to be spherulized readily in the molten state thereby facilitating the manufacture of glass spheres or beads from the composition.

A further object of the invention is to provide a glass composition which has a reduced tendency to form bubbles or gas inclusions.

A still further object of the invention is to produce a glass composition which is economical to manufacture, both as to raw materials and as to melting costs.

These and other objects and advantages are provided in a glass composition generally comprising from 65% to about 66% $SiO_2$; from about 5% to about 12% $B_2O_3$; from 16% to about 19% $Na_2O$; from about 1% to about 4% of at least one metal oxide selected from the group consisting of $K_2O$ and $Li_2O$; from about 4% to about 6% CaO; from 0 to about 3% MgO; and from about 1% to about 3% of at least one metal oxide selected from the group consisting of $Fe_2O_3$ and $Al_2O_3$.

In the preferred embodiment of the invention, to 65% silicon dioxide is added basically two ingredients; these ingredients being boric oxide in a preferred quantity of about 8%, and sodium oxide in a preferred quantity not less than 16%. It is found that the use of less than 16% sodium oxide in conjunction with silicon dioxide in an amount less than 65% will not form glass beads because it creates a glass which attenuates and forms fibers. Furthermore in the event the critical factor of 65% silicon dioxide is reduced, the glass produced does not have sufficient durability to withstand the erosive effects to which macroscopic glass beads are subjected. It is appreciated that boro-silicate and sodium-silicate glass compositions have relatively low viscosity curves which render such basic compositions particularly suitable for the manufacture of glass beads. In the compositions of the invention, it is the intention that the viscosity curve should not be in excess of log 2 at a temperature of from 2000° F. to 2100° F. It has been found that the unique combination of boric oxide and sodium oxide, along with the silicon dioxide exhibits a viscosity curve of log 2 at about 2060° F.

In order to increase hardness, structural stability, and surface tension, and decrease the susceptibility to erosion and deterioration due to atmospheric conditions without materially affecting the viscosity of the resultant glass composition, the following constituents were added. It has been found that by adding calcium oxide preferably in an amount of about 5% to the composition the structural stability of the resultant glass composition is substantially increased. The surface tension of the glass may be increased without materially increasing the viscosity by adding a small amount of magnesium oxide not in excess of about 2%. To reduce viscosity, lithia may be added in the amount of approximately 2%. To further offset any increase in viscosity which might occur due to the addition of a larger amount of magnesium oxide a combination of trace materials may be added. These trace materials which can be expressed as $R_2O_3$ principally consist of iron oxide. Together with the trace materials it is found, in most instances, advisable to include a decolorizer such as selenium to offset the color formation due to the ferric oxide. The total of these trace materials, including the ferric oxide, in the preferred embodiment is about 1%.

To decrease the susceptibility to erosion or deterioration due to atmospheric conditions, a surface hardener and stabilizer such as aluminum oxide is added preferably in an amount of approximately 1%.

The resulting glass composition embodies all of the chemical and physical characteristics desirable for glass beads and the molten composition may be readily spherulized without the problem of the formation of bubbles or air inclusions which occur in high viscosity compositions.

In a demonstration of the economy of manufacture of the glass composition hereinafter described as the preferred embodiment of the invention, Example I, a comparison of the time required for melting applicant's composition and the time required to melt a representative plate and window glass composition is given. The representative plate and window glass composition used for comparison is described by D. E. Sharp in "The Properties of Glass," Morey, 2nd edition (1954), on page 77, as follows: $SiO_2$, 71.5% by weight; $Al_2O_3$, 1.5% by weight; $Na_2O$, 14.0% by weight; CaO, 13.0% by weight. Using an electric muffle furnace maintained at 1800° F. ±5° F., an accurately measured quantity of each of the above glass compositions was weighed into a platinum crucible and placed in the muffle furnace where each glass composition was subjected to the above temperature. The applicant's composition was thoroughly molten in 12.3 minutes; whereas, the Sharp composition was thoroughly molten only after 65.1 minutes. Therefore, the melting time for the applicant's composition is only 18.9% of the melting time for the Sharp composition. The economy evident here is either that the applicant's composition requires only one-fifth the furnace area, or five times as much material may be melted in the same size furnace, or one-fifth the fuel will be required to melt the same amount in the same furnace.

Examples of glass compositions manufactured in accordance with the principles of the present invention are as follows:

*Example I*

According to the preferred embodiment of the invention, the glass composition comprises the following ingredients:

| | Percent |
|---|---|
| Silicon dioxide ($SiO_2$) | 65 |
| Boric oxide ($B_2O_3$) | 8 |
| Sodium oxide ($Na_2O$) | 16 |
| Lithium oxide ($Li_2O$) | 2 |
| Calcium oxide (CaO) | 5 |
| Magnesium oxide (MgO) | 2 |
| Ferric oxide ($Fe_2O_3$) | 1 |
| Aluminum oxide ($Al_2O_3$) | 1 |

*Example II*

In a modified embodiment of the invention, the glass composition comprises the following ingredients:

| | Percent |
|---|---|
| Silicon dioxide ($SiO_2$) | 65 |
| Boric oxide ($B_2O_3$) | 6 |
| Sodium oxide ($Na_2O$) | 17 |
| Potassium oxide ($K_2O$) | 3 |
| Calcium oxide (CaO) | 5 |
| Magnesium oxide (MgO) | 2 |
| Aluminum oxide ($Al_2O_3$) | 2 |

*Example III*

In another modified embodiment of the invention, the glass composition comprises the following ingredients:

| | Percent |
|---|---|
| Silicon dioxide ($SiO_2$) | 65 |
| Boric oxide ($B_2O_3$) | 10 |
| Sodium oxide ($Na_2O$) | 16 |
| Calcium oxide (CaO) | 5 |
| Magnesium oxide (MgO) | 2 |
| Aluminum oxide ($Al_2O_3$) | 1 |
| Ferric oxide ($Fe_2O_3$) | 1 |

This application constitutes a continuation-in-part application of the application (now abandoned) of Charles E. Searight, Serial No. 775,106, filed November 20, 1958, and entitled "Glass Composition."

According to the provisions of the patent statutes, I have explained the principles of my invention, and have described what I now consider to represent its best embodiments. However, I desire to have it understood that, within the scope of the appended claims, the invention may be practiced otherwise than as specifically described.

What I claim is:

1. A glass composition for the manufacture of glass beads having a refractive index of from about 1.50 to about 1.60 consisting essentially of from about 65% to about 66% silicon dioxide; from about 5% to about 12% boric oxide; from about 16% to about 19% sodium oxide; from about 1% to about 4% of at least one metal oxide selected from the group consisting of lithium oxide and potassium oxide; from about 4% to about 6% calcium oxide; from 0 to about 3% magnesium oxide; and from about 1% to about 3% of at least one metal oxide selected from the group consisting of ferric oxide and aluminum oxide.

2. A glass composition for the manufacture of glass beads having a refractive index of from about 1.50 to about 1.60 consisting essentially of from about 65% to about 66% silicon dioxide; from about 6% to about 8% boric oxide; from about 16% to about 18% sodium oxide, from about 2% to about 4% of a metal oxide selected from the group consisting of potassium oxide and lithium oxide, from about 4% to about 5% calcium oxide, from 0 to about 2% magnesium oxide and about 2% aluminum oxide.

3. A glass composition for the manufacture of glass beads having a refractive index of from about 1.50 to about 1.60 consisting essentially of about 65% silicon dioxide; about 8% boric oxide; about 16% sodium oxide; about 2% lithium oxide; about 5% calcium oxide; about 2% magnesium oxide; about 1% aluminum oxide; and about 1% ferric oxide.

4. A glass composition for the manufacture of glass beads having a refractive index of from about 1.50 to about 1.60 consisting essentially of about 65% silicon dioxide; about 6% boric oxide; about 16% sodium oxide; about 3% potassium oxide; about 5% calcium oxide; about 2% magnesium oxide; and about 2% aluminum oxide.

References Cited in the file of this patent

UNITED STATES PATENTS

| 2,582,852 | Shoemaker | Jan. 15, 1952 |
| 2,877,124 | Welsch | Mar. 10, 1959 |